June 22, 1926.

J. WALDHEIM 1,589,773

TYPEWRITING MACHINE

Filed Oct. 27, 1922      2 Sheets-Sheet 1

Inventor:
John Waldheim
by B.C. Stickney
Attorney

June 22, 1926.
J. WALDHEIM
TYPEWRITING MACHINE
Filed Oct. 27, 1922
1,589,773
2 Sheets-Sheet 2
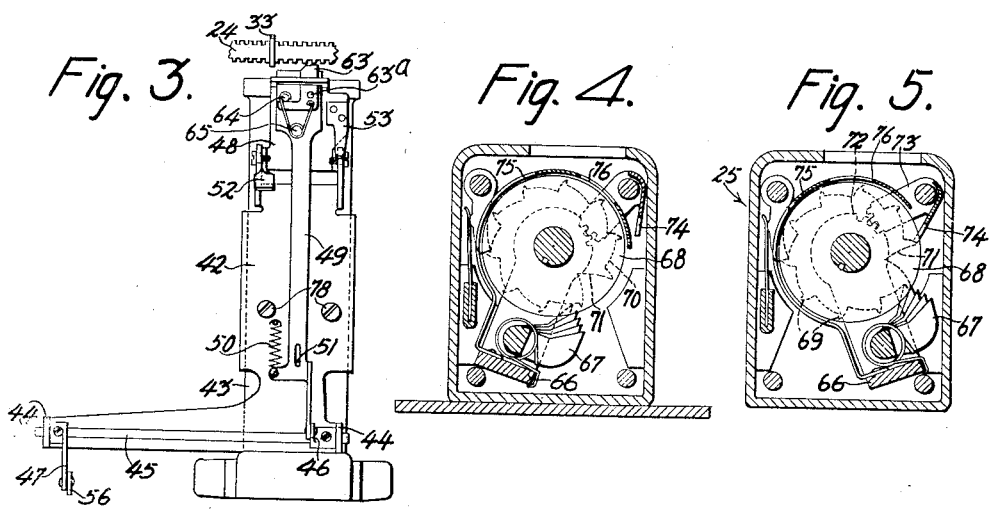
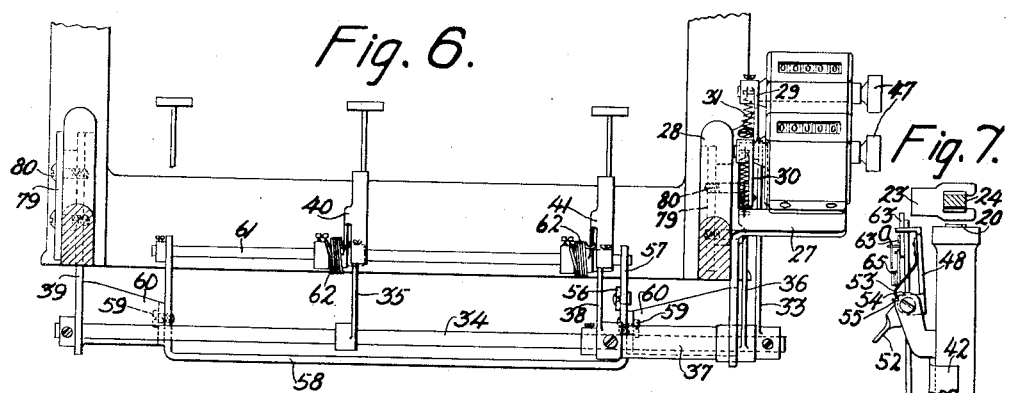
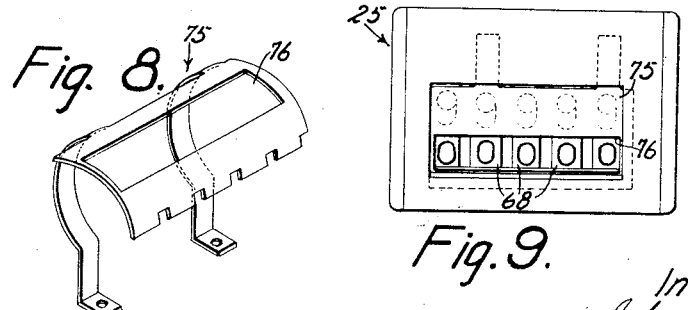
Inventor:
John Waldheim
by O.B. Stickney
Attorney Patented June 22, 1926.

1,589,773

UNITED STATES PATENT OFFICE.

JOHN WALDHEIM, OF ELIZABETH, NEW JERSEY, ASSIGNOR TO UNDERWOOD TYPEWRITER COMPANY, OF NEW YORK, N. Y., A CORPORATION OF DELAWARE.

TYPEWRITING MACHINE.

Application filed October 27, 1922. Serial No. 597,253.

This invention relates to typewriting machines, and more particularly to typewriting machines equipped with mechanism for the writing of bills for telephone service, in which operation it is required to type separately the amounts of United States taxes. The invention, however, is useful for other purposes.

It is desired not only to type the tax items separately, but also to indicate the totals of the tax items for a day or other period, and one of the features of the present invention relates to securing such totals. In other machines designed for this purpose, special keys have been provided for writing "5" and "10" (these amounts being the only amounts ever written in the tax column), and registers of the type of the well-known Veeder cyclometer have been provided for separately counting the operations of these keys or for separately adding the items written by them. A feature of the present invention is the provision of registers of the form referred to and connections for operating them from the regular "5" key and the regular "0" key, respectively, but only when the machine is in the units column of the tax zone, the "5" and "0" keys being operable at other times without affecting the counting mechanism.

Another feature of the invention is the provision of means, preferably operated by the tabulating stop on the carriage which controls the positioning of the carriage in the tax zone, to automatically establish the operating connections between the "5" and "0" keys and their registers when the carriage is in position to cause a character to be printed in the units column of said zone, and to automatically discontinue the connections as soon as the carriage is moved from said units column.

Another feature of the invention is the provision of means for causing the tabulating stop, referred to, to be ineffective to establish the register-operating connections in the tax zone when desired. The operator is thus enabled to write numbers in the tax column not to be computed, or to compensate for the counting of tax items written in bills which have to be rewritten on account of being erroneously written in the first instance, and so to cause the registers to indicate the correct totals upon the completion of the corrected bills.

The register-mechanisms are arranged to be advanced by springs and to be retracted by the depressing of their respective number keys, the springs being effective to maintain the register parts normally at the advanced limits of their movements. The number-wheels of the registers are normally maintained in a locked condition as a result of this arrangement, it being necessary to depress the associated numeral-key of a register in order to operate the register-clearing mechanism, as explained in the application of Adolph G. Kupetz, Serial No. 592,682, filed October 6, 1922. This results in the running in of a unit on the number-wheels of a register immediately after the clearing mechanism has been operated, which makes it desirable to arrest the clearing operation with the number-wheels standing at "9" instead of "0" and to add "1" on the return stroke of the key to restore the number-wheels to "0". A feature of the present invention is the provision of a shutter shiftable with the number-wheel-operating mechanism to cause the "0"'s to be visible through the sight-opening of the register when the operating arm is depressed, while the "9"'s are in the position to be visible under normal conditions.

Other features and advantages will hereinafter appear.

In the accompanying drawings,

Figure 3 is a rear fragmentary elevation, showing the tabulating stop for controlling the register-operating connections and the mechanism operated by it.

Figure 4 is a front-to-rear vertical section of one of the registers, showing the parts in the positions occupied when the register-operating arm is depressed.

Figure 5 is a view similar to Figure 4, showing the parts in their normal positions.

Figure 6 is a front sectional elevation of a portion of the machine.

Figure 7 is a side elevation of the mechanism shown in Figure 3, with the connection-controlling mechanism moved to an inoperative position.

Figure 8 is a perspective view of one of the shutters detached from its register.

Figure 9 is a plan view of one of the registers, showing the shutter and the number-wheels in the positions occupied by them at the conclusion of the operation of the register-clearing mechanism, and before the register-operating arm has been permitted to return to normal.

Figure 1:
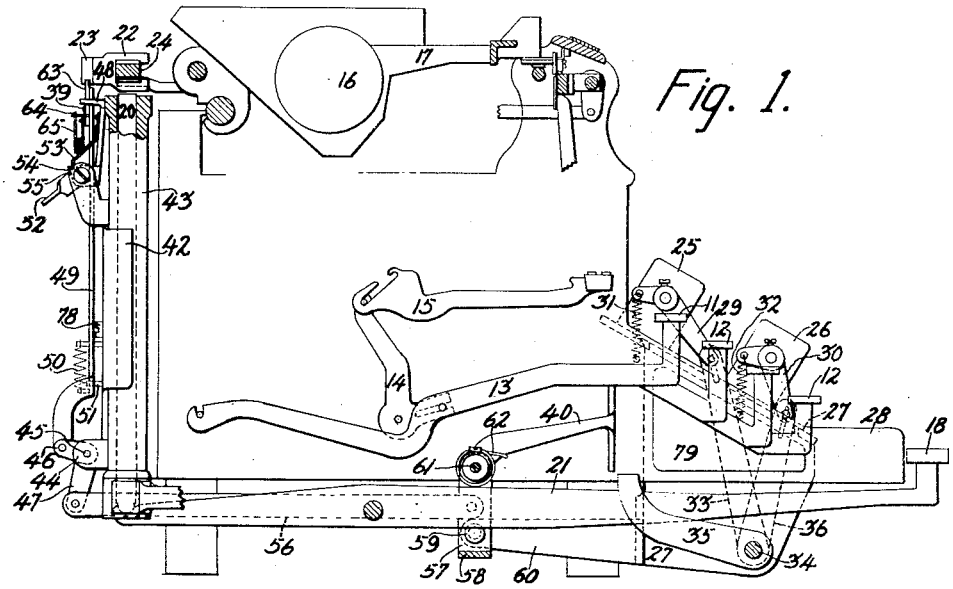
Figure 1 is a sectional side elevation of an Underwood standard typewriting machine with the improvements of the present invention applied thereto.
Figure 2:
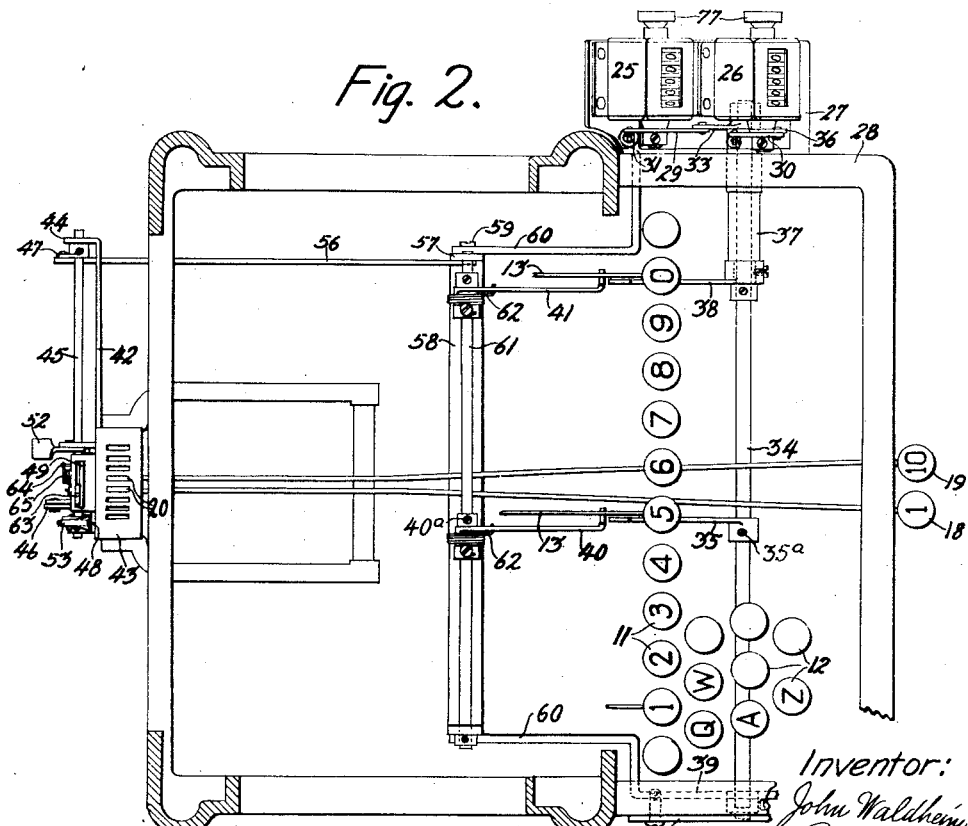
Figure 2 is a horizontal section of the machine with parts omitted to permit clear illustration of the register-connections and their controlling means.

The machine comprises the usual number-keys 11, from "0" to "9", inclusive, alphabet-keys 12 and key-levers 13, operated by the keys to cause bell-cranks 14 to throw type-bars 15 up to strike rearwardly against a platen 16, mounted in a traveling carriage 17. The carriage is movable in letter-feed direction by a carriage-propelling spring (not shown), under the control of escapement-mechanism (not shown). Decimal-tabulating keys 18 and 19 are effective when operated to release the carriage from the influence of the escapement-mechanism and cause it to be drawn toward the left by the carriage-propelling spring. Decimal-tabulating stops 20 are moved by these keys, through levers 21, into positions to co-operate with stops 22 and 23 adjustably mounted upon a rack 24 on the rear of the carriage 17 to arrest the carriage in positions to cause printing to be effected in the desired columns.

Registers 25 and 26 for counting the operations in the units column of the tax zone of the "5" key and the "0" key, respectively, are mounted upon a bracket 27 clamped to the frame 28 of the machine. The operating arms 29 and 30 of the respective registers 25 and 26 are advanced and are normally held at the advanced limits of their movements by springs 31 and 32. The operating arm 29 of the register 25 has pin-and-slot connections with a crank 33 fixed on a rock-shaft 34 which has a second crank 35 arranged to underlie the key-lever 13 of the "5" key at a considerable distance below it. The operating arm 30 of the register 26 similarly has pin-and-slot connections with a crank 36 fixed on a sleeve 37, rotatable on the rock-shaft 34, which has a second crank 38 arranged to underlie the key-lever 13 of the "0" key at a considerable distance below it. The rock-shaft 34 is mounted in the bracket 27 and another bracket 39 clamped to the frame 28 at the opposite side of the machine. The key-levers 13 of the "5" and "0" keys are normally inoperative to depress the cranks 35 and 38 to cause operation of the registers 25 and 26, and are rendered operative to do so by the interposition of thrust-members 40 and 41 between the key-levers 13 and the respective cranks 35 and 38. These thrust-members or interponents 40 and 41 are normally held beyond the rear extremities of the cranks 35 and 38 and are moved forward automatically by connections, operated by the tabulating stop 23 on the carriage for arresting the carriage in the tax zone, which will now be described.

A bracket 42, secured upon a portion 43 of the machine-frame which houses the tabulating stops 20, supports, in ears 44, at its lower end, a rock-shaft 45 having cranks 46 and 47 fixed upon it, and supports, at its upper end, a pivoted guide 48 for guiding the upper end of a vertically-extending thrust-rod 49 connected to the crank 46. The thrust-rod 49 is drawn upwardly by a spring 50, connected to the thrust-rod and to the bracket 42, into engagement with a pin 51 on the bracket 42 which positively limits the thrust-rod's upward movement and determines its normal position. The pivoted guide 48 is movable by a finger-piece 52 to either of two positions to hold the upper end of the thrust-rod 49 in position to be engaged and depressed by the tabulating stop 23 or to hold it to the rear of the stop 23 to prevent its depression thereby. A spring-detent 53 on the pivoted guide 48 co-operates with notches 54 and 55 on the bracket to retain the guide in the respective positions referred to. A horizontally-extending link 56 is connected at its rear end to the crank 47 and at its forward end is pivotally connected to an upstanding arm 57 of a yoke 58. The yoke is pivotally supported near its lower end upon shouldered screws 59 borne by rearward extensions 60 of the brackets 27 and 39 and carries, remote from its pivot, a fixed shaft 61 upon which the interponents 40 and 41 are pivoted. Light springs 62 urge the interponents 40 and 41 upward into engagement with the key-levers 13 of the "5" and "0" keys, respectively. The thrust-rod 49 carries at its upper end, for engagement with the tabulating stop 23, a pivoted dog 63, having an inclined upper face. The dog is normally held in engagement with a fixed stop 64 on the rod 49 by a spring 65. This dog 63 acts as a positive thrust-member to force the rod 49 down when the carriage is advanced to the units column of the tax zone, but is arranged to yield about its pivot 63ᵃ when the stop 23 engages it in the return movement of the carriage. The stop 23 is the only tabulating stop on the carriage having a tail of sufficient length to engage the dog 63 in the normal operative position of the rod 49. When the finger-piece 52 is moved to swing the guide 48 to the position of Figure 7, the rod 49 is positioned too far rearwardly to be engaged even by the stop 23, and the registers 25 and 26 will not be operated in the tax zone.

The registers 25 and 26 are identical, so that a description of one will suffice for both. The operating arm 29 of the register 25 oscillates a yoke 66, upon which is pivotally mounted a series of pawls 67, spring-pressed toward number-wheels 68, for co-operation with ratchet-teeth 69 thereon and with intervening shallow and deep notches 70 and 71 in the usual manner. A hub-portion 72 of the yoke operates a gear-segment 73 to swing stops 74 into and out of engagement with the number-wheels 68 to prevent overthrow of them and to lock them against advance in the normal position of the parts, which is the position of Figure 5. A shutter 75, having an opening 76 wide enough to permit a single line of figures on the number-wheels to be visible through it, is mounted on the yoke 66 and is oscillated therewith. When the parts are in their normal positions, the opening 76 in the shutter occupies the position in which it is shown in Figure 5, but, when the operating arm 29 of the register is operated to unlock the number-wheels 68 to permit the register to be cleared, the shutter 75 is swung to the position of Figures 4 and 9. When the operator turns a finger-wheel 77 to clear the register, the "0"'s will be seen through the shutter when the "9"'s are in the position to be visible under normal conditions. In clearing the register, the operator will depress the operating arm 29 to unlock the number-wheels 68, and will thereby shift the shutter 75. He will turn the number-wheels through operation of the finger-wheel 77 until the "0"'s are visible through the shutter, and will then permit the numeral-key to return. Consequently the operating arm 29 is operated by the spring 31 to run in a digit, and, since the number-wheels were in reality standing at "9" when the "0"'s were visible through the shifted shutter, the number-wheels will all be advanced a number-space. The shutter will be shifted back to its normal position at the same time, so that the register will stand ready to begin a series of operations with the "0"'s of all of the number-wheels visible through the shutter and sight-opening.

The mechanism of this invention may be applied to any standard typewriter provided with decimal-tabulating stops, without altering or modifying the machine beyond providing small threaded holes in the rear of the decimal-tabulator-stop-housing to receive screws 78 for securing the bracket 42 in place. The brackets 27 and 39 are clamped to the machine-frame 28 by clamping plates 79 and connecting screws 80 which pass through the triangular openings customarily formed in the opposite ends of the keyboard-extension of the machine-frame.

Should it be desired to count the operations of a key other than the "5" key in the register 25, it is only necessary to loosen the screws 35ª and 40ª which fix the positions of the crank-arm 35 and the interponent 40 longitudinally of their shafts, shift the crank and interponent into positions to co-operate with the key-lever of the key whose operations it is desired to count, and fix them in their new positions by tightening the screws 35ª and 40ª.

The mechanism described provides that the depression of the denominational tabulator-key 18 will automatically release the carriage and the carriage will be arrested by the special stop 23 at the units position for the typing of the "5" key at a predetermined column-position. The free movement of this stop in a letter-space direction will trip the pawl 63 to set the interponent 40 over the crank-arm 35 to the register 25, at the instant the carriage is arrested by the units denominational stop 20, and the relation of the parts is such that when the "5" key is depressed, the numeral "5" will be typed and the crank-arm 35 to the register 25 will be vibrated for a registering operation and the release of the "5" key will letter-space the carriage, and this single-letter-space movement will cause the stop 23 to release the trip 63 and the several parts will be restored by their springs to effect the withdrawal of the interponent 40 from the field of the arm 35. Similarly, if the tens key 19 of the denominational tabulating mechanism is depressed, the stop 23 will be arrested at a tens position in another column, with the stop adjacent the trip 63, so that when the "1" key is depressed to type the numeral "1", no registering movement takes place, but the letter-space movement of the carriage after the typing of the numeral "1" causes the stop 23 to vibrate the trip 63 and set the interponent 41 over the arm 38 to the register 26, and, when the "0" key is operated to print to complete the numeral "10", the operation of the "0" key will vibrate the arm 38, and a registry of a "10" item will be entered in the register 26. The release of the "0" key effects a letter-space movement, which moves the stop 23 to effect the release of the trip 63.

In like manner, it will be noted that any of the number-keys from "1" to "9", except the "5" key in the present construction, may be operated to type in a tens-stop-position, and when followed by the depression of the "0" key the register will be actuated. Furthermore, by the employment of denominational tabulating keys, the stop 23 may be arrested at any position, in advance of the units-trip-position, predetermined by the denominational tabulator key depressed to enable the printing of certain numbers without the actuation of the register, and when followed by the depression of the "0" key, operation of the register takes place. It will be further noted that the connection shown adjusted to the "0" key may be shifted to the "8" key, for example, and this latter key may be used to actuate the register.

Variations may be resorted to within the scope of the invention, and portions of the improvements may be used without others.

Having thus described my invention, I claim:

1. In a typewriting machine, a number-writing key, and means operated exclusively by the number-writing key for counting the operations thereof in a single column of the machine only.

2. In a typewriting machine, a carriage, a number-writing key, means operated exclusively by the number-writing key for counting successive operations thereof in a single column, and means operated by the carriage to render the key operable to count.

3. In a typewriting machine, a number-key, a register, a key-lever operated by the number-key, register-operating means connected to the register, comprising a crank underlying the key-lever beyond the lower limit of the key-lever's movement, and an interponent mounted independently of the key and arranged to slide between the key-lever and crank to cause the crank to be depressed and the register to be operated by depression of the key.

4. In a typewriting machine, a number-key, a register, a key-lever operated by the number-key, register-operating means connected to the register, comprising a crank underlying the key-lever beyond the lower limit of the key-lever's movement, and an interponent normally positioned beyond the rear extremity of the crank and arranged to be thrust forward between the key-lever and crank to cause the crank to be depressed and the register to be operated by depression of the key.

5. In a typewriting machine, a number-key, a register, a key-lever operated by the number-key, register-operating means connected to the register, comprising an arm positioned beyond the path of movement of the key-lever but in line therewith, and an element mounted independently of the key and arranged to be moved into position between the key-lever and the arm to bridge the space between them to cause the arm to be operated by movement of the key-lever.

6. In a typewriting machine, a number-key, a register arranged for operation exclusively by the number-key, a key-lever operated by the number-key, means for operating the register, comprising an arm spaced below the down stroke of the key-lever, and an interponent mounted independently of the key and arranged to be moved into position between the key-lever and the arm in engagement with both of them to cause the register to be operated by depression of the number-key.

7. In a typewriting machine, a set of number-keys from "0" to "9", register mechanism arranged to be operated exclusively by the "0" and "5" keys, normally incomplete operating connections between the register mechanism and said "0" and "5" keys, and means for completing the operating connections.

8. In a typewriting machine, a traveling carriage, a number-writing key, an operation-counting register to be operated exlusively by the number-key, a register operating device, a connection mounted independently of the key that is movable therewith, but normally out of alignment with the register operating device, and means operated by the carriage to bring the key-connection and register operating device into alignment with each other to register a typing operation in a single column of the machine only.

9. In a typewriting machine, a traveling carriage, short stops mounted thereon to arrest the carriage in denominational positions, a long stop on the carriage to arrest the carriage at a columnar position, a number-writing key, an operation-counting register to be operated exclusively by the number-key, a register operating device, a connection mounted independently of the key that is movable therewith but normally out of alignment with the register operating device, and means operated by the long stop on the carriage to bring the key-connection and register operating device into alignment with each other to register a typing operation in a single column of the machine only.

10. In a typewriting machine, a traveling carriage, tabulating mechanism, a number-writing key, an operation-counting register to be operated exclusively by the number-key, register operating means, a connection mounted independently of the key that is movable therewith, but normally out of alignment with the register operating means, a long stop movable with the carriage to bring the key-connection and register operating means into alignment with each other to register a typing operation in a single column of the machine only, and additional short stops movable with the carriage to arrest the carriage at denominational positions, but incapable of operating a connection between the key and register.

11. In a typewriting machine, a plurality of number-keys, a plurality of counters operated respectively by the number-keys, normally incomplete counter-operating connections between the number-keys and the counters, a shaft, a plurality of interponents on the shaft for completing the counter-operating connections, and means for moving the shaft bodily to complete the connections simultaneously.

12. In a typewriting machine, a plurality of number-keys, key-levers operated thereby, a plurality of counters operated respectively by the number-keys, normally incomplete counter-operating connections between the number-keys and the counters, a shaft, a plurality of interponents on the shaft for completing the counter-operating connections, springs normally holding the interponents in engagement with the key-levers, and means for moving the shaft bodily to cause the interponents to complete the counter-operating connections.

13. In a typewriting machine, a plurality of number-keys, key-levers operated by the number-keys, registers each arranged for operation exclusively by one of the number-keys, normally incomplete register-operating connections between the key-levers and the registers, interponents to complete the register-operating connections, a carrier for the interponents, and means for moving the carrier and thereby moving the interponents to positions to complete the register-operating connections.

14. In a typewriting machine, a key for writing a character, counting mechanism constructed only for counting operations of the key, mechanism including a column-stop for automatically selecting certain operations of the key to be counted, and means for disabling the selecting mechanism to render it inoperative by a single letter-spacing movement of the carriage to print a character.

15. In a typewriting machine, a key for writing a character, counting mechanism constructed only for counting the operations of the key, and mechanism including a column-stop on the carriage for automatically selecting certain single letter-space operations of the key to be counted, said column-stop being removably secured to the carriage to render the selecting mechanism operative or inoperative at will.

16. In a typewriting machine, a traveling carriage, tabulating mechanism, printing instrumentalities including character-keys, normally inoperative register mechanism for counting printing operations in a single column only, and controlling mechanism to render the register operative to count and operated by said tabulating mechanism.

17. In a typewriting machine, a traveling carriage, tabulating mechanism, printing instrumentalities including character-keys, normally inoperative register mechanism for counting printing operations in a single column only, controlling mechanism to render the register operative to count and operated by said tabulating mechanism, and means for printing a numeral in a columnar field without registering and to automatically cause the same numeral to print in another field to register the operation.

18. In a typewriting machine having a carriage, a number-key, mechanism for counting the operations of the number-key, normally incomplete operating connections between the number-key and the counting mechanism, an interponent arranged to be moved to complete the operating connections of the counting mechanism, a tabulating stop on the carriage, means arranged for operation by engagement with the tabulating stop to move the interponent into position to complete the operating connections of the counting mechanism, and a guide for said means arranged to position it for operation by the tabulating stop or to position it beyond the reach of the tabulating stop.

19. In a typewriting machine, a carriage, a number-key, a register operated by the number-key, normally incomplete register-operating connections between the number-key and the register, mechanism for automatically completing the register-operating connections, comprising a vertically-movable thrust-rod, a tabulating stop on the carriage for operating the thrust-rod, and a pivoted guide for the thrust-rod arranged to occupy either of two positions to render the connection-completing mechanism operative or inoperative at the will of the operator.

20. In a typewriting machine, a carriage, a number-key, a register operated by the number-key, normally incomplete register-operating connections between the number-key and register, mechanism for automatically completing the register-operating connections, comprising a vertically-movable thrust-rod, means mounted on the carriage and movable therewith for normally engaging and depressing the thrust-rod at a predetermined position in the movement of the carriage to complete the register-operating connections, a thrust-rod guide normally in position to maintain the thrust-rod in position to be engaged and depressed by said means, but movable to a position to maintain the thrust-rod beyond the reach thereof, and means for latching said guide in either of said positions.

21. In a typewriting machine, a plurality of number-keys, counters for counting the operations thereof, normally incomplete connections between the number-keys and counters, mechanism for completing the connections comprising a thrust-rod, means for operating the thrust-rod, a guide for the thrust-rod, means for moving the guide to positions to locate the thrust-rod in operative and inoperative relationships to its operating means, and means for retaining the guide in either of said positions.

22. In a typewriting machine, a carriage, a number-key, a counter arranged for actuation exclusively by the number-key, incomplete counter-operating connections between the number-key and the counter, means for completing said connections, a tabulating stop on the carriage arranged to operate the connection-completing means when the latter is held in normal position, and means for moving the connection-completing means to inoperative position.

23. In a typewriting machine, a number-key, and a register comprising number-wheels arranged to count the operations of the number-key, means normally locking the number-wheels and arranged to be operated to unlock them by depression of the number-key, register-clearing means operable when the number wheels are unlocked, and a slotted shutter automatically shiftable a distance of one number-space on the number-wheels, upon depression of the number-key, in the direction opposite to that in which the number-wheels advance.

24. In a typewriting machine, a number-key, and a register comprising number-wheels arranged to count the operations of the number-key, register-clearing mechanism, means normally locking the number-wheels against turning movement by the register-clearing mechanism, means for operating the number-wheels in counting, reciprocable means movable in one direction by depression of the number-key to retract said operating means and unlock the number-wheels, and movable in the opposite direction by a spring to advance the number-wheels and lock them, and a slotted shutter mounted on said reciprocable means for unitary movement therewith to expose to view different lines of figures on the number-wheels at the opposite limits of its movements.

25. In a typewriting machine, a number-key, mechanism for counting the operations of the number-key on the up stroke thereof, means for clearing the counting mechanism, operable only when the number-key is depressed, a shutter for exposing to view a single line of numbers on the counting mechanism, and means for automatically shifting the shutter when the number-key is depressed to a position such that the "0"'s will be exposed to view when the "9"'s have been brought into position to be visible in the normal position of the shutter.

26. In a typewriting machine, a number-key, and a register comprising number-wheels for counting the number of times that the number-key is depressed, register-clearing mechanism for turning the number-wheels, means normally locking the number-wheels against turning movement by the clearing mechanism and movable to unlock them by depression of the key, and a shutter automatically shiftable to expose to view a different line of figures on the number-wheels when the number-key is depressed from that exposed in the normal position of the key.

27. In a typewriting machine, a number-key, mechanism for counting selected operations of the number-key on the up stroke thereof, normally incomplete operating connections between the number-key and the counting mechanism, means movable into position to complete the operating connections, means for clearing the counting mechanism, operable only when the operating connections are complete and the key is depressed, a shutter for exposing a single line of numbers on the counting mechanism, and means for automatically shifting the shutter, when the number-key is depressed and the counting-mechanism-operating connections are completed, to a position such that the "0"'s will be exposed to view when the "9"'s have been brought into position to be visible through the shutter in its normal position.

28. In a register, a set of number-wheels, means normally locking the number-wheels, reciprocable number-wheel-operating mechanism operating in its retracted movement to unlock the number-wheels, register-clearing mechanism for turning the number-wheels with the operating mechanism in retracted position, and a shutter carried by the operating mechanism and shiftable with it to expose to view lines of numbers in different locations in its normal and shifted positions.

29. In a register, a set of number-wheels, means normally locking the number-wheels, number-wheel-operating means retractible to an abnormal position to unlock the number-wheels, register-clearing mechanism operable when the number-wheels are unlocked, and means operated by the number-wheel-operating means for exposing one line of figures on the wheels when the operating means is in its normal position and another line of figures when the operating means is in its retracted position.

30. In a register, a set of number-wheels, means normally locking the number-wheels, number-wheel-operating means retractible to abnormal position to unlock the number-wheels and effective in its return to normal position to advance the number-wheels, register-clearing mechanism operable when the number-wheels are unlocked, and means for indicating to the operator in the retracted position of the number-wheel-operating means that the wheels stand at "0" when they, in reality, stand at "9".

31. In a typewriting machine, a stationary frame, a keyboard extension thereof having openings in its opposite ends to lighten the frame, a pair of brackets secured to the machine frame at its opposite ends, means passing through said openings and engaging the sides thereof to position and secure the brackets in place, a shaft mounted in said brackets, a set of number-keys, arms arranged to be depressed by the operations of the respective number-keys mounted for oscillation about the axis of said shaft, and registers connected to the respective arms for operation thereby.

32. In a typewriting machine, a traveling carriage, mechanism including an adjustable carriage-stop, printing instrumentalities including character-keys, registering mechanism for counting printing operations, an interponent movable in and out of operative relation between a key and the register, and means movable by the carriage to automatically shift said interponent into operative relation between the key and its register during the intervals the carriage passes through a predetermined single letter-space zone.

33. In a typewriting machine, a traveling carriage, mechanism including a plurality of column-stops, printing instrumentalities including numeral-keys, a plurality of normally inoperative operation-counting registers, one register for each column-stop, to register operations in a single column only predetermined by the location of its associated column-stop, and means operated by each column-stop to render all the registers operative and the selected numeral-key determining which register shall become active to count.

34. In a typwriting machine, a series of keys, key-levers operated by the keys having their lower faces in substantially the same horizontal plane, a register, means for operating the register comprising a rock-shaft and a crank extending rearwardly from the rock-shaft to lie a considerable distance below the plane of the key-levers and adjustable longitudinally of the shaft, an interponent arranged to be placed between the crank and a key-lever, a carrier for the interponent, and means for adjusting the interponent on its carrier to bring it into co-operative relationship to the crank in different adjusted positions thereof.

35. In a typewriting machine, a set of number-keys, a register for counting the operations of a number-key, normally-incomplete register-operating connections comprising a crank, and means operable to complete the connections, the said crank and connection-completing means being independently but correspondingly adjustable to enable the register to be operatively connected to any one of several keys.

36. In a typewriting machine, the combination of a plurality of type-keys, a plurality of registers, one to be operated by each type-key, said keys being normally ineffective to actuate said registers, and means to render all of the registers effective simultaneously, so that they may be actuated by their associated type-keys.

37. In a typewriting machine, a "1" and a "0" writing key, a register, and means whereby in two adjoining letter-space positions the "1" key will print and not register and the "0" key will print and register the denominational value of both numerals as "10".

38. In a typewriting machine, including a traveling carriage, numeral-writing keys, a register, and means under the control of the carriage whereby in two adjoining letter-space positions any numeral-key will print in the first of said positions and not register and the "0" key will print in the second of said positions and actuate the register.

39. In a typewriting machine, the combination of a type-key, a register to count the actuations of said type-key, a register-operating arm disposed beneath said key, an element to be interposed between said key and said register-operating arm, a swinging frame to support said element, a carriage, an adjustable device on said carriage, a plunger operable by said adjustable device at a predetermined position in the travel of said carriage, a shaft to be rotated by said plunger, and a link to be operated by said shaft, said link being connected with said swinging frame.

40. In a typewriting machine having a main frame, the combination of a type-key, a register to count the actuations of said type-key, a register-operating arm disposed beneath said key, an element to be interposed between said key and said register-operating arm, a swinging frame to support said element, a carriage, an adjustable device on said carriage, a plunger operable by said adjustable device at a predetermined position in the travel of said carriage, a shaft to be rotated by said plunger, a link to be operated by said shaft, said link being connected with said swinging frame, brackets detachably secured to the sides of said main frame, said swinging frame being pivotally supported on said brackets, one of said brackets supporting the register, and a detachable bracket to support the shaft and said plunger.

41. In a typewriting machine having a main frame, the combination of two type-keys, two registers to count the actuations of said type-keys, one register associated with each type-key, register-operating arms disposed beneath said keys, a register-actuating shaft connected with one of said arms, a register-operating sleeve connected with the other arm and supported on said shaft, elements to be interposed between said keys and said register-operating arms, a swinging frame to support said elements, a carriage, an adjustable device on said carriage, a plunger operable by said adjustable device at a predetermined position in the travel of said carriage, a shaft to be rotated by said plunger, a link to be operated by the last-named shaft, said link being connected with said swinging frame, brackets detachably secured to the sides of said main frame, said swinging frame being pivotally supported on said brackets, said register-operating shaft being also supported on said brackets, one of said brackets supporting the registers, and a detachable bracket to support said plunger and the rock-shaft operable thereby.

42. In a typewriting machine, denominational tabulating means including a key-actuated denominational stop to co-operate with a carriage-stop, an operation-counting register, and means whereby the carriage may be released and arrested at a tens position within a fixed column area, to receive a type-impression of "1" without registering, to be followed by a type-impression of "0" in the units position that simultaneously registers the denominational value of both impressions as "10".

43. In a typewriting machine, denominational tabulating means including a key-actuated denominational stop to co-operate with a carriage-stop, an operation-counting register, and means whereby the carriage may be released and arrested at any denominational position within a fixed column area, to receive typed impressions of any selected numerals without registering, to be followed by a single type-impression in the units position to complete the numeral and simultaneously actuate the register.

JOHN WALDHEIM.